(12) United States Patent
Beel et al.

(10) Patent No.: US 6,390,894 B1
(45) Date of Patent: May 21, 2002

(54) FACE GEAR MANUFACTURING METHOD AND APPARATUS

(75) Inventors: Ken Beel, Dundas; David Fisher, Milton; Adrian Russell, Richmond Hill; George Folprecht, Willowdale, all of (CA)

(73) Assignee: Derlan Aerospace Canada (CA)

( * ) Notice: Subject to any disclaimer, the term of this patent is extended or adjusted under 35 U.S.C. 154(b) by 0 days.

(21) Appl. No.: 09/466,649

(22) Filed: Dec. 20, 1999

Related U.S. Application Data

(60) Provisional application No. 60/113,193, filed on Dec. 21, 1998.

(51) Int. Cl.[7] .................................................. B25B 1/00
(52) U.S. Cl. ...................... 451/47; 451/232; 451/219; 451/253; 451/275; 409/27; 409/28
(58) Field of Search .................... 451/47, 56, 177–178, 451/72, 219, 232, 253, 275; 409/27, 28, 25–30

(56) References Cited

U.S. PATENT DOCUMENTS

| | | | | |
|---|---|---|---|---|
| 3,213,756 A | * | 10/1965 | Ash, II | 409/30 |
| 4,930,950 A | * | 6/1990 | Stadtfeld | 409/27 |
| 4,981,402 A | * | 1/1991 | Krenzer et al. | 409/27 |
| 5,116,173 A | * | 5/1992 | Goldrich | 409/26 |
| 5,174,699 A | * | 12/1992 | Faulstich | 409/26 |
| 5,800,103 A | * | 9/1998 | Stadtfeld et al. | 451/47 |
| 5,823,857 A | | 10/1998 | Tan | 451/47 |
| 5,857,894 A | * | 1/1999 | Griebach et al. | 451/10 |
| 6,120,355 A | * | 9/2000 | Stadtfeld et al. | 451/47 |
| 6,146,253 A | * | 11/2000 | Litvin et al. | 451/47 |

* cited by examiner

*Primary Examiner*—Derris H. Banks
*Assistant Examiner*—Lee Wilson
(74) *Attorney, Agent, or Firm*—Edward H Oldham

(57) ABSTRACT

A face gear manufacturing operation wherein a set of oversized teeth are formed on a face gear or tapered pinion gear by a gear cutting operation. The oversized teeth are of a predetermined profile. The gear bearing the oversize teeth is then subjected to metallurgical surface hardening operation. At the conclusion of the heat treatment surface hardening operation, the face gear or pinion gear is subjected to a continuous grinding operation wherein a grinding wheel having a worm profile of a predetermined shape is rotated to grind the previously cut teeth to produce a finished tooth profile. The operation is CNC controlled. The gear producing apparatus requires only a slight modification to produce a face gear or a tapered pinion gear by the simple interchange of work heads.

14 Claims, 15 Drawing Sheets

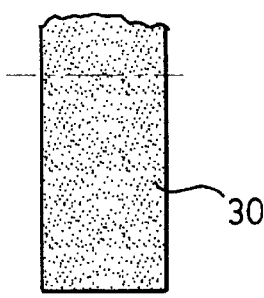
FIG. 2. (PRIOR ART)
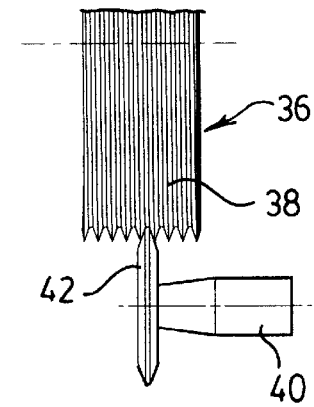
FIG. 3. (PRIOR ART)
FIG. 4. (PRIOR ART)
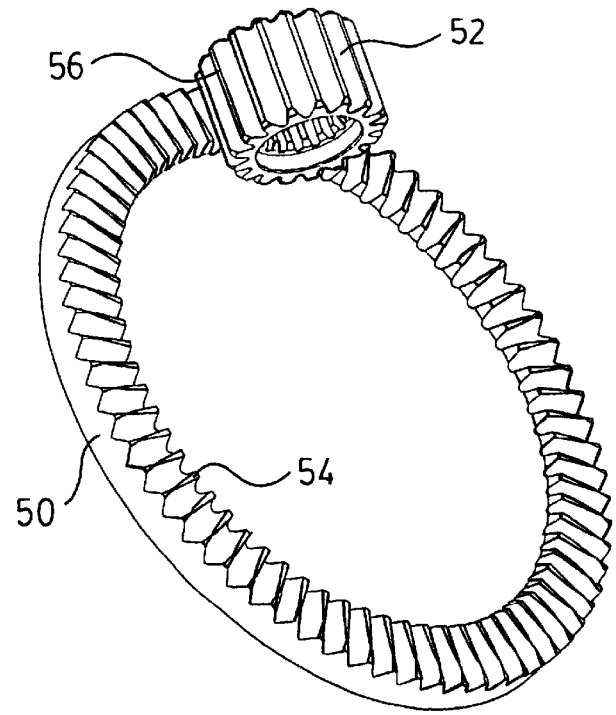

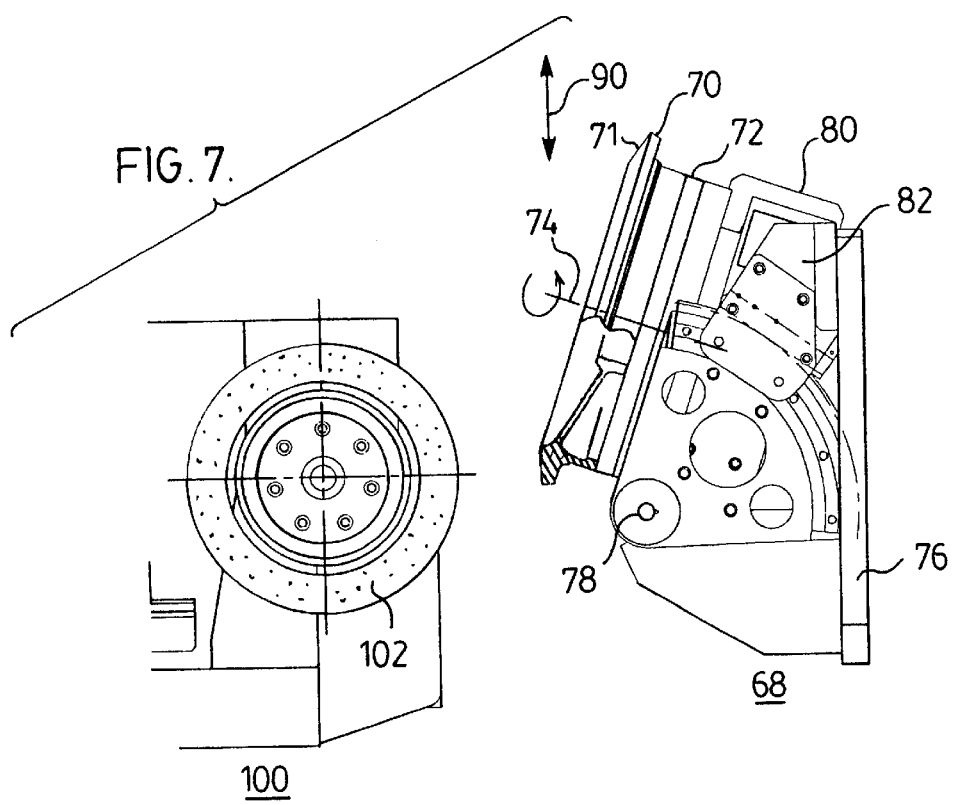
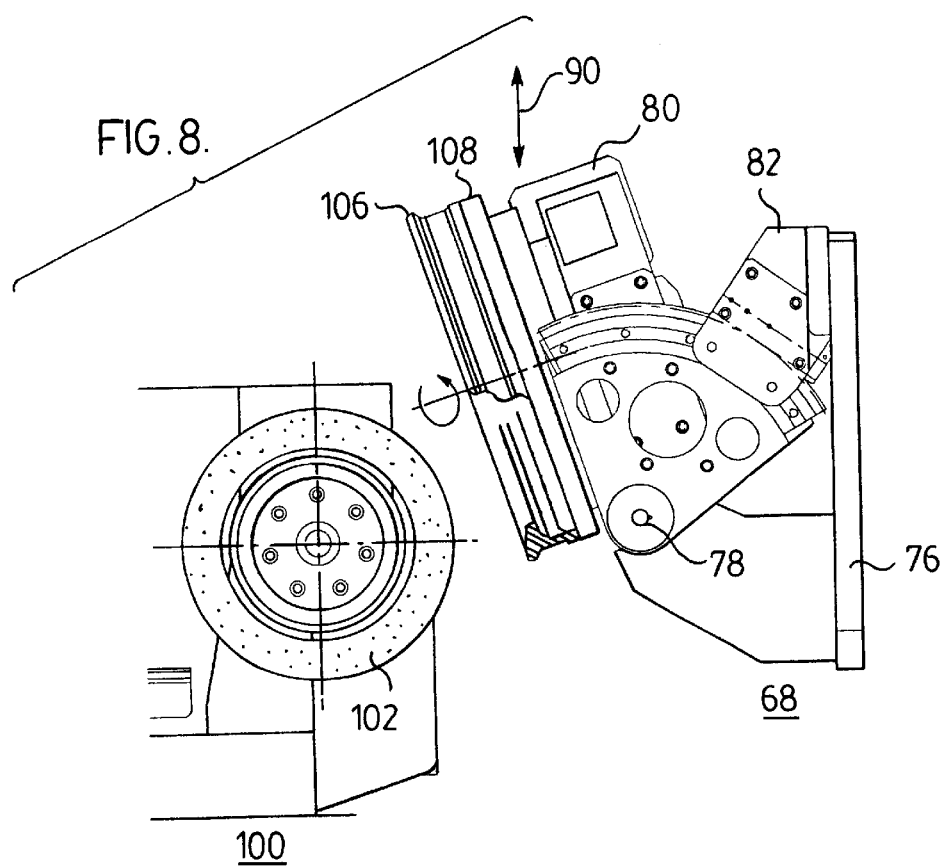

FACE GEAR MANUFACTURING METHOD AND APPARATUS

This application claims the benefits of provisional application Ser. No. 60/113,193 filed on Dec. 21, 1998.

BACKGROUND OF THE INVENTION

The development of Face Gears for high power transmission is a relatively recent phenomenon. Historically, the transmission of power through a Face Gear set was limited to relatively low levels because of two factors: the tooth profile of the mating gears was generated by shaper cutting and, although as very acceptable tooth profile could be generated, the tooth produced by the shaping operation did not have a hardened surface. The tooth profile produced by the shaping operation required that the resulting Face Gear set be kept in almost perfect alignment.

Any operation performed on the Face Gear set to harden the surface of the shaped teeth tended to distort the shape of the Face Gear set during the hardening operation.

The current method of manufacture of Face Gears was developed by the Fellows Corporation using a gear shaper apparatus and the finished product is useful for the transmission of power for low power applications.

Recently however, development has been undertaken by McDonnell Douglas Helicopter Systems supported by NASA Lewis Research Center with regard to designing and developing Face Gears for use in high power applications (Ref. NASA Technical Memorandum 106101/AVSCOM Technical Report 92-C-009).

The applicant, herein, has successfully developed the manufacturing practices and the associated equipment required to produce Face Gear sets for high power transmission applications.

The Face Gear method of manufacture developed by the Fellows Corporation of shaping the gear teeth, is a metal cutting process, which can only be applied to materials with suitable hardness and metal cutting characteristics. If the material is too hard, the shaper tool will not cut effectively. This shaping process can only be used effectively for finish cutting Face Gear teeth from metals suitable for low power applications. This process does not give the accuracy and surface finish required for higher power applications.

BRIEF DESCRIPTION OF THE INVENTION

Gear blanks are roughly machined as in the prior art, to produce toothed wheels wherein the gears produced have slightly enlarged teeth which makes allowance for a subsequent grinding operation. The Fellows shaper method is quite acceptable for the production of gears from blanks in this operation.

The gear (now having enlarged shaped teeth) is thence subjected to a heat treatment operation to increase the surface hardness of the gear teeth. During this operation, the rough cut gear will usually undergo some physical distortion which occurs during the heat treatment operation. The excessive material deliberately left on the gear teeth in the gear shaping operation, will be sufficient to allow a subsequently distorted gear to be restored to its required shape by a grinding operation.

The heat treated gear is now ground to the final shape and accuracy having the desired tooth profile. At this stage, the resulting gear has a hardened tooth on a gear platform which is quite stable because of the stress relieving operation. Grinding is the only known method that will produce the accuracy and surface finish required for high power transmissibility applications.

The surface grinding operation is a continuous operation with the grinding wheel and the face gear constantly rotating and moving such that the grinding wheel moves across the face of the rotating face gear in a controlled fashion. The grinding wheel has a surface which is commonly referred to as a "worm" and in grinding a face gear, the surface of the grinding wheel is being constantly eroded by its constant engagement with the hardened metal surface of the previously formed teeth on the face gear. After deposits of the grinding debris, both from the erosion of the grinding wheel and from the material removed from the gear teeth during the grinding operation tend to be redeposited on the surface of the grinding wheel during the grinding operation. A suitable dressing wheel mounted on the grinding machine periodically restores the worm profile to its proper configuration.

In the manufacture of spur gears, the movement of a diamond dressing disc used to restore the profile of the spur gear grinding wheel must be controlled in both X and Y axes.

This application requires that the movement of a suitable dresser disc be controlled in both the X and Y axes as previously for spur gears, but also the disc must be controlled for movement in a pivot axis (designated the "A" axis) to produce the desired grinding wheel worm profile to properly shape the teeth on the Face Gears being ground.

In addition to having the dresser tool move in the X, Y and A axes, the tool must be capable of manual adjustment in two additional axes.

Gear tooth grinding of spur gears is performed by the coordinated rotation of the grinding wheel and a gear blank so that the grinding wheel worm engages the gear blank in a constant meshing operation during the grinding operation. The area of engagements of the worm of the grinding wheel with the rotating spur gear is changed by moving the spur gear rectilinearly in its axial direction during a grinding operation to complete the tooth forming operation.

In face gear grinding operations, the axis rotation of the grinding wheel relative to the face gear is significantly different. The reason for this is that for face gear grinding operations, the grinding wheel must move the complete distance along the length of the teeth of the face gear and be parallel to the plane of the surface of the gear face in which the face gear teeth are being formed.

In grinding face gears, the angle of the teeth generated in the gear face may vary widely with respect to the rotational axis of the face gear, thus grinding of the teeth of a face gear presents a substantial challenge.

BRIEF DESCRIPTION OF THE DRAWINGS

FIG. 2 is a partial view of a prior art blank grinding wheel (before the wheel is shaped).

FIG. 3 is a partial view of a spur gear grinding wheel of the prior art showing the dressing tool used to provide a cutting profile.

FIG. 4 is a perspective illustration of a face gear and a mating pinion gear.

FIG. 7 shows an elevational view of the grinding apparatus of this invention for grinding teeth on a convex face gear.

FIG. 8 shows an elevational view of the grinding apparatus of FIG. 7 adapted for grinding teeth on a concave face gear.

DESCRIPTION OF THE PREFERRED EMBODIMENT

Figure 1:
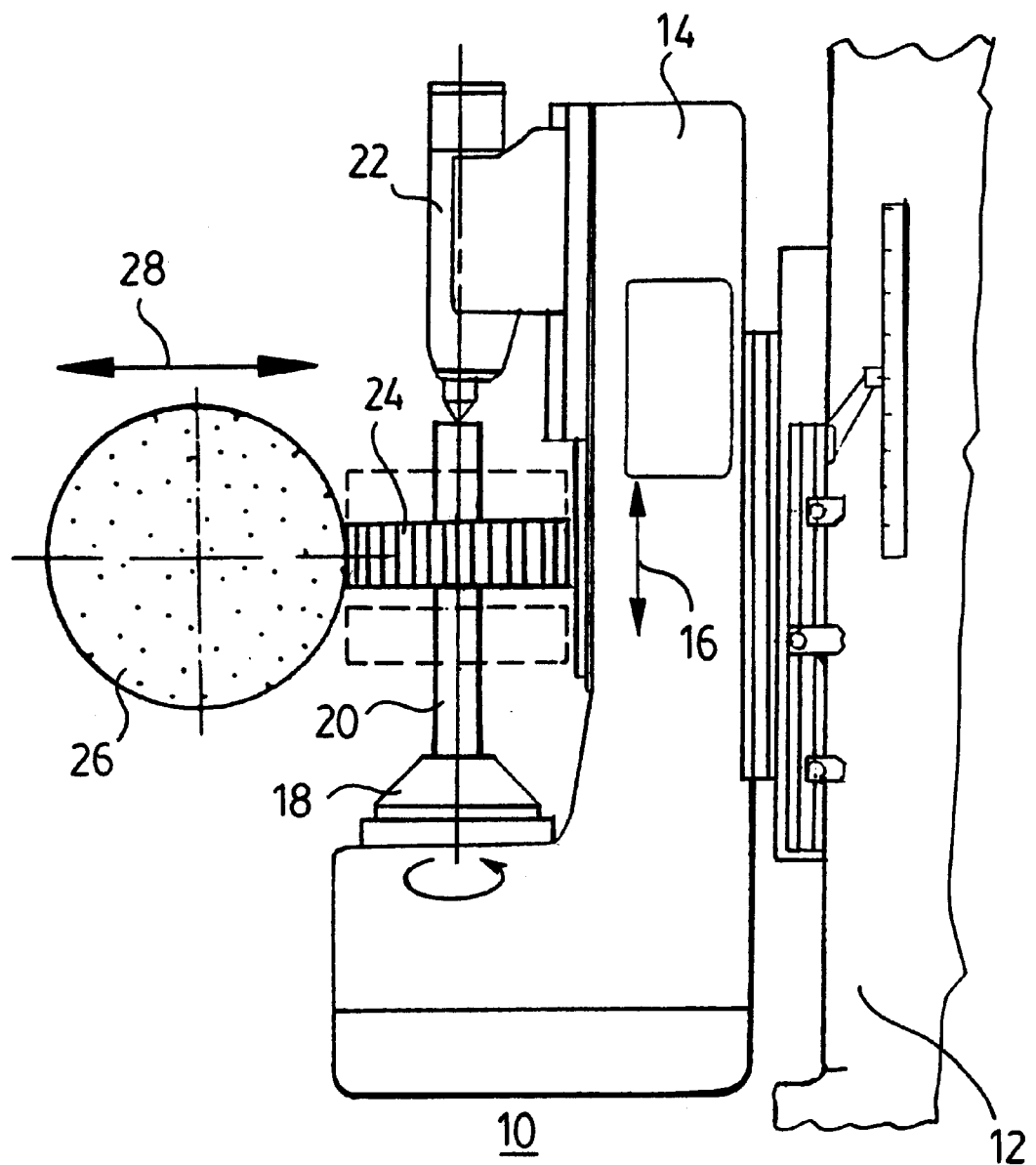
FIG. 1 is an elevational view of a prior art spur gear cutting machine.

FIG. 1 shows a prior art spur gear grinding apparatus 10. Here, a machine 12 (partially shown) is provided with a movable carrier 14 which is capable of executing rectilinear motion as shown by double arrow 16. Carrier 14 is provided with a gear driving head 18 which is connected to lead shaft 20.

Shaft 20 is centered at its remote end in tailstock 22 to stabilize the shaft 20. A spur gear 24 is mounted on shaft 16 so as to be controllably rotated by driving head 18.

A spur gear grinding wheel 26 is shown engaging the peripheral surface of spur gear 24. Grinding wheel 26 takes the form of the grinding wheel as shown in FIG. 3 and must be capable of movement toward and away from gear 24 as indicated by double arrow 28. The rotation of the grinding wheel is coordinated with the rotation of the spur gear.

To produce a ground spur gear, the grinding wheel 26 is advanced toward the gear 24 while the gear 24 is synchronously rotated to be in step with the "worm" profile at grinding wheel 26, until the grinding wheel 26 has advanced to the desired depth into a selected area of the spur gear. The spur gear is now gradually moved in an axial direction to permit the grinding wheel to complete the grinding along the tooth length of the gear. This process is repeated for increased material removal until tooth size and profile are achieved.

FIG. 2 shows a grinding wheel 30 of the prior art before being dressed to have a grinding profile.

FIG. 3 shows a grinding wheel 36 which contains a peripheral worm profile 38 (used for grinding spur gear teeth as previously described), which profile is formed by dressing tool 40 which carries a special shaped dressing disc 42 to provide the worm profile. The dressing tool 40 is moved across the surface of the grinding wheel 36 as the grinding wheel 36 rotates. The disc 42 is advanced into the surface of the wheel 36 until the desired tooth form is achieved. Note that the shape of the profile on the surface of wheel 38 is formed by the shape of the profile of grinding disc 42 (i.e. the axis of rotation of disc 42 is usually parallel to the axis of rotation of wheel 36).

FIG. 4 shows an illustration of a face gear 50 and a meshing pinion 52. The teeth 54 on face gear 50 extend in a radial direction; the teeth 56 on pinion 52 are parallel to the axis rotation of the pinion 52.

Figure 5:
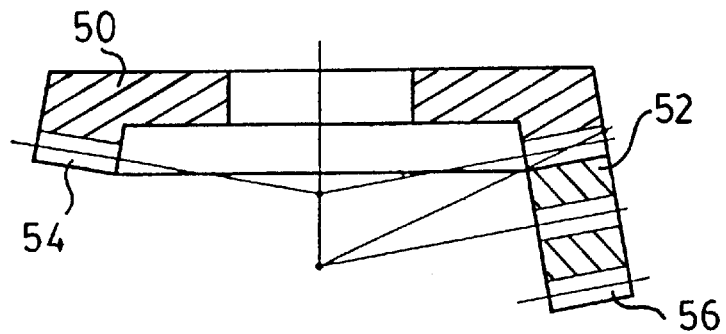
FIG. 5 is a sectional view of a mating pinion and face gear.

FIG. 5 shows the face gear 50 and pinion in section. The teeth 54 and 56 are shown in a meshed condition.

Figure 6:
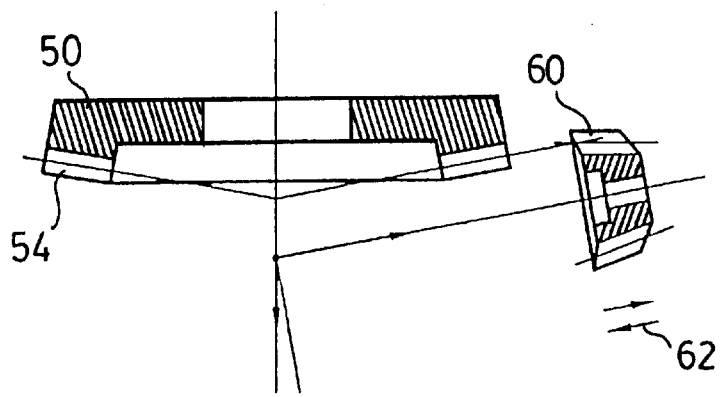
FIG. 6 shows a sectional view of a face gear shaping apparatus of the prior art.

FIG. 6 is an illustration of a prior art method of shaping the teeth on face gear 50 by shaper cutter 60. The shaper cutter 60 is reciprocated in an axial direction (as shown by arrows 62) while it and the face gear 50 are simultaneously rotated so that the face gear 50 and the shaper cutter 60 are constantly moving in a simulated meshing engagement, until the desired tooth form has been generated.

FIG. 7 is an illustration of a face gear work head 68 and face gear grinding head 100 used for grinding the teeth of convex shaped face gear 70.

In this illustration, convex face gear 70 is mounted on a controllable rotating table 72 so as to rotate about axis 74. Rotating table 72 is pivotably mounted on base 76. The pivoting action occurs about pivot 78. Motor 80 serves to drive the rotating table 72 through a suitable drive. The degree of pivot of the rotating table 72 is closely controlled by pivot selector 82. In the illustration shown, the gear face angle is maintained in a vertical orientation at the point of grinding. The whole rotating face gear head 68 must be capable of executing controlled motion in a vertical direction during a tooth grinding operation as shown by arrow 90.

Grinding head 100 has a grinding wheel 102 rotatably mounted thereon. The grinding head 100 is precisely located with respect to face gear work head 68 and the grinding wheel 102. CNC control permits controlled motion in the vertical and horizontal axis.

Grinding wheel 102 is provided with a special worm profile (see FIGS. 10 and 11) and the grinding operation is carried out by advancing grinding wheel 102 toward face gear 70 so that the grinding wheel profile and the face gear teeth mesh precisely i.e. the worm of the grinding wheel 102 has a profile which meshes with the teeth of the face gear 70. The feed mechanism for generating the teeth on the face gear 70 slowly moves the face gear 70 in a vertical direction until the grinding wheel has traversed the entire width of the tooth face 71 of face gear 70. The grinding wheel 102 is gradually advanced into the surface 71 of face gear 70 with each succeeding pass until the desired tooth profile is produced.

FIG. 8 shows the same machine adapted to grind teeth on a concave face gear 106. In this instance, FIG. 8 shows face gear work head 68 having the face gear rotating table 72 pivoted through an angle of about 25° from the position shown in FIG. 7. Again, the teeth of the concave face gear 106 are in a vertical plane at the point of engagement with grinding wheel 102. The grinding of the teeth is accomplished in the same manner as the tooth generating operation carried out in FIG. 7.

Figure 9:
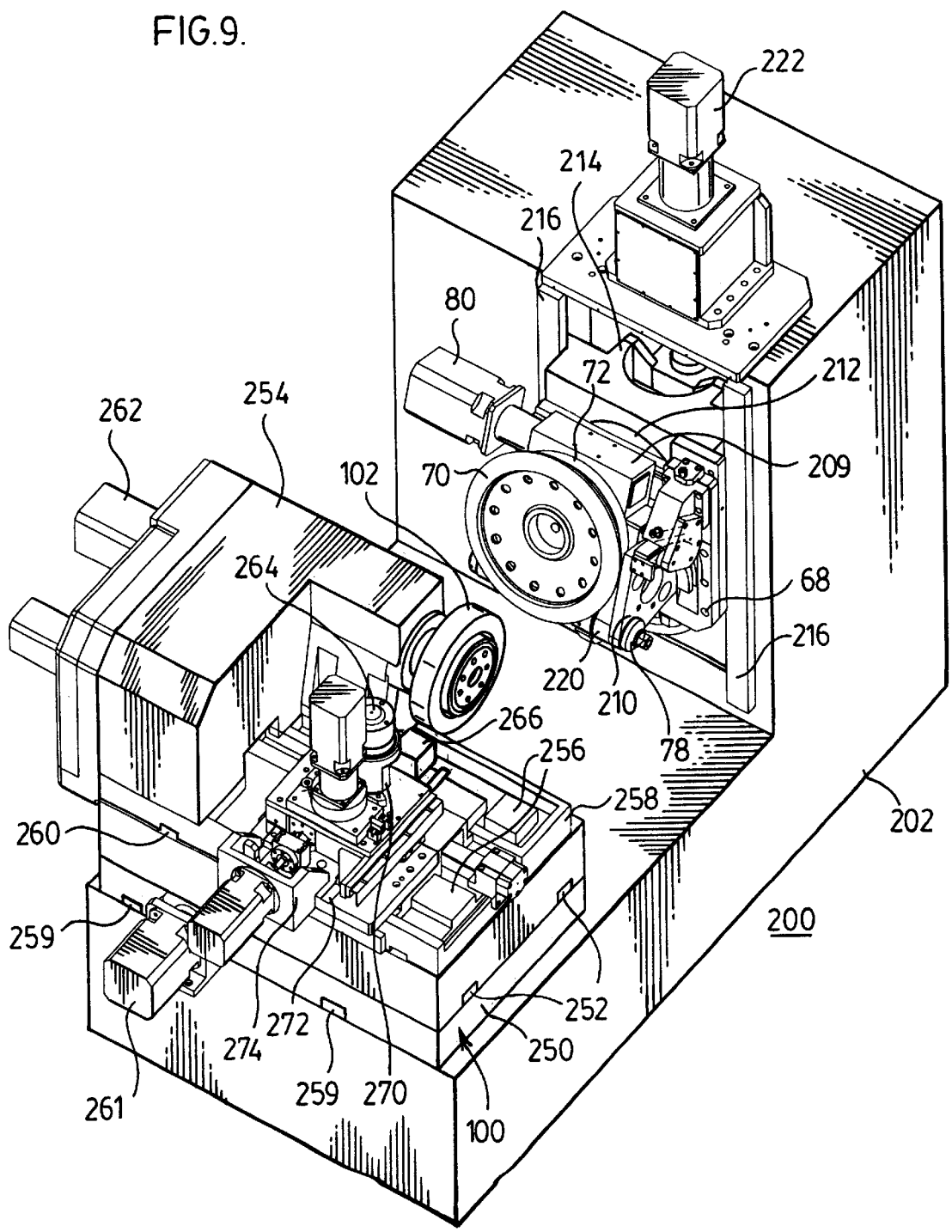
FIG. 9 is a perspective view of a complete grinding machine for grinding teeth on a convex face gear.

FIG. 9 shows the full gear grinding machine 200 in perspective. A base 202 is provided to permit the face gear work head 68 to be mounted thereon in a predetermined fashion. This apparatus drives a rotating table 72 on which face gear 70 is mounted in a controlled manner about its axis (designated axis B). The pivot 78 is used to set the face gear at a predetermined angle (face angle) in machine 200 manually and is locked in this position. This pivot mechanism 210 is mounted on a swivel 212 on work table 214 to permit the face gear to have a manually adjustable angular setting. The work table 214 is constrained to permit it to move in a vertical plane along rails 216 by drive motor 222. This vertical axis is designated as the "W" axis.

Drive motor 80 drives face gear 70 through transmission 209 and this, in turn, is mounted via pivot mechanism 78 and pivot supports 220 to the work table swivel 212 which allows the pivot mechanism to also swivel about its mounting on the work table 214. The swivel axis is designated as the WTS axis.

The grinding head 100 (on which grinding wheel 102 is mounted) is mounted on base 202 in such a manner that grinding wheel 102 may be moved toward and away from face gear work head 68 and grinding wheel 102 may move tangentially to face gear work head 68 as well.

Grinding head 100 is permitted to move along rails 259 to produce motion of the carriage 254 toward and away from the face gear work head 68. The is a "feed" axis which is designated as the "V" axis.

Carriage 254 is also mounted on rails 252 to produce motion of the grinding wheel 102 in a tangential direction with respect to face gear 70. This axis is designated as the "TF" axis.

Grinding table 258 is capable of pivoting carriage 254 about pivot 260. This is the grinding wheel pivot axis and is designated as the "WT" axis.

Figure 10:
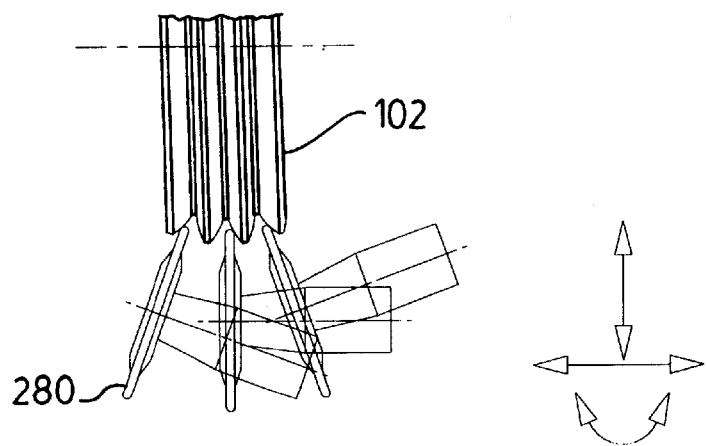
FIG. 10 is a plan view of the grinding wheel of this invention showing associated dresser apparatus motion.
Figure 11:
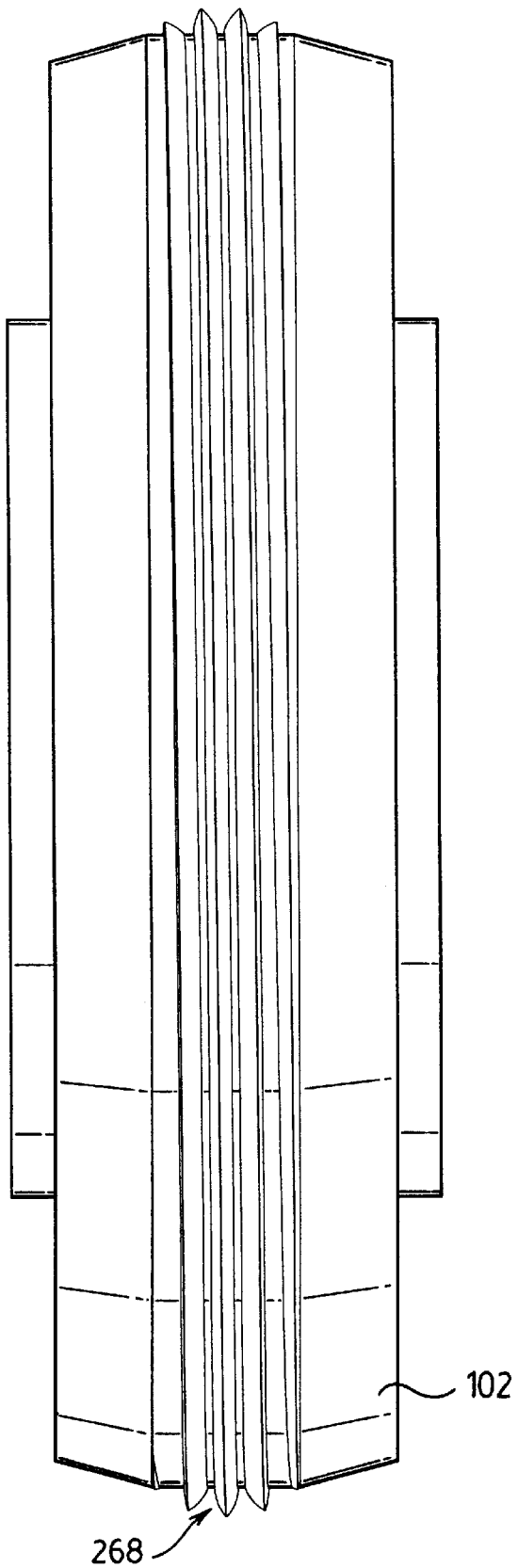
FIG. 11 is an elevational view of a grinding wheel showing a typical face gear grinding configuration used in this invention.
Figure 12:
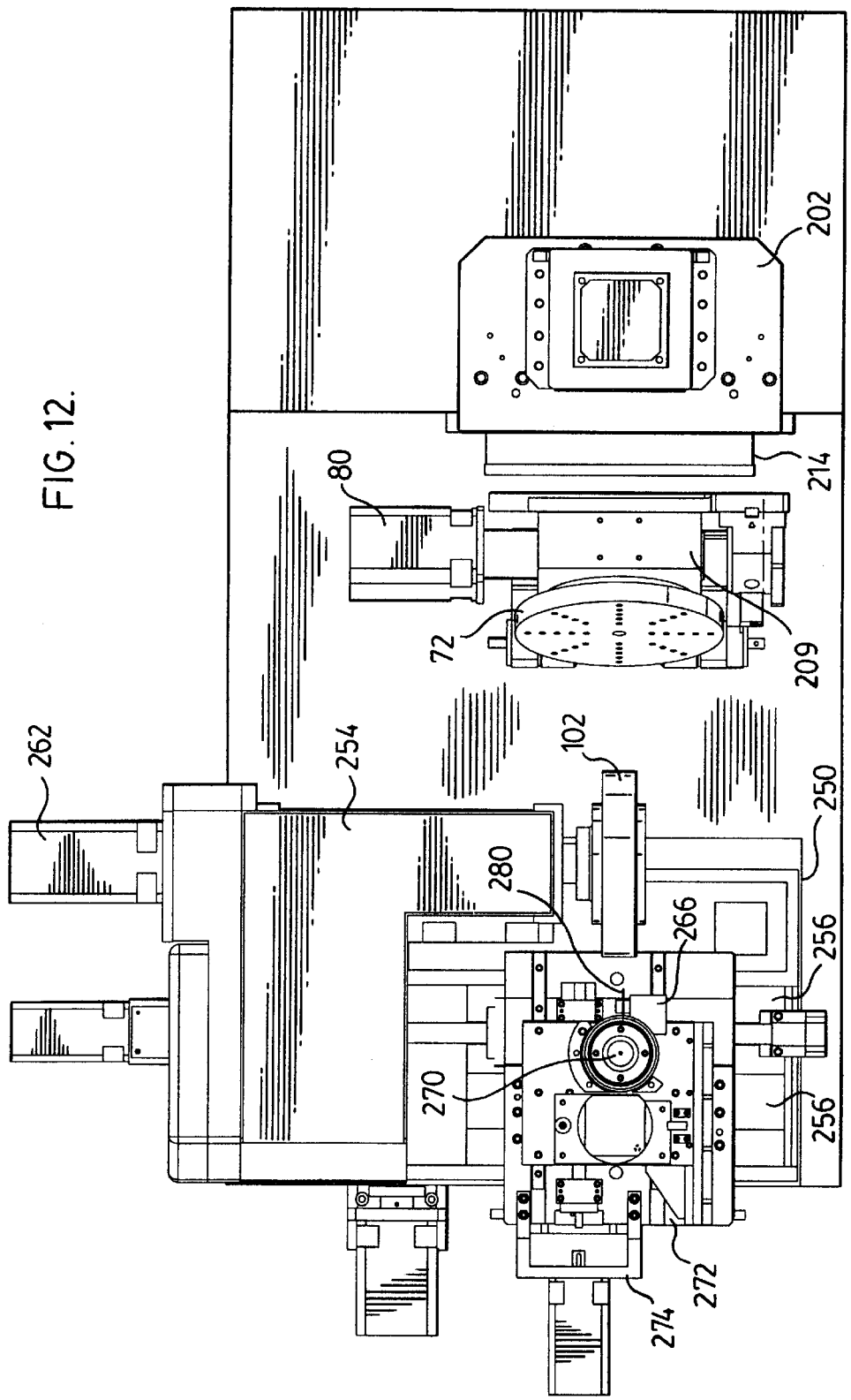
FIG. 12 is a plan view of the grinding machine of FIG. 9 with the face gear removed.
Figure 13:
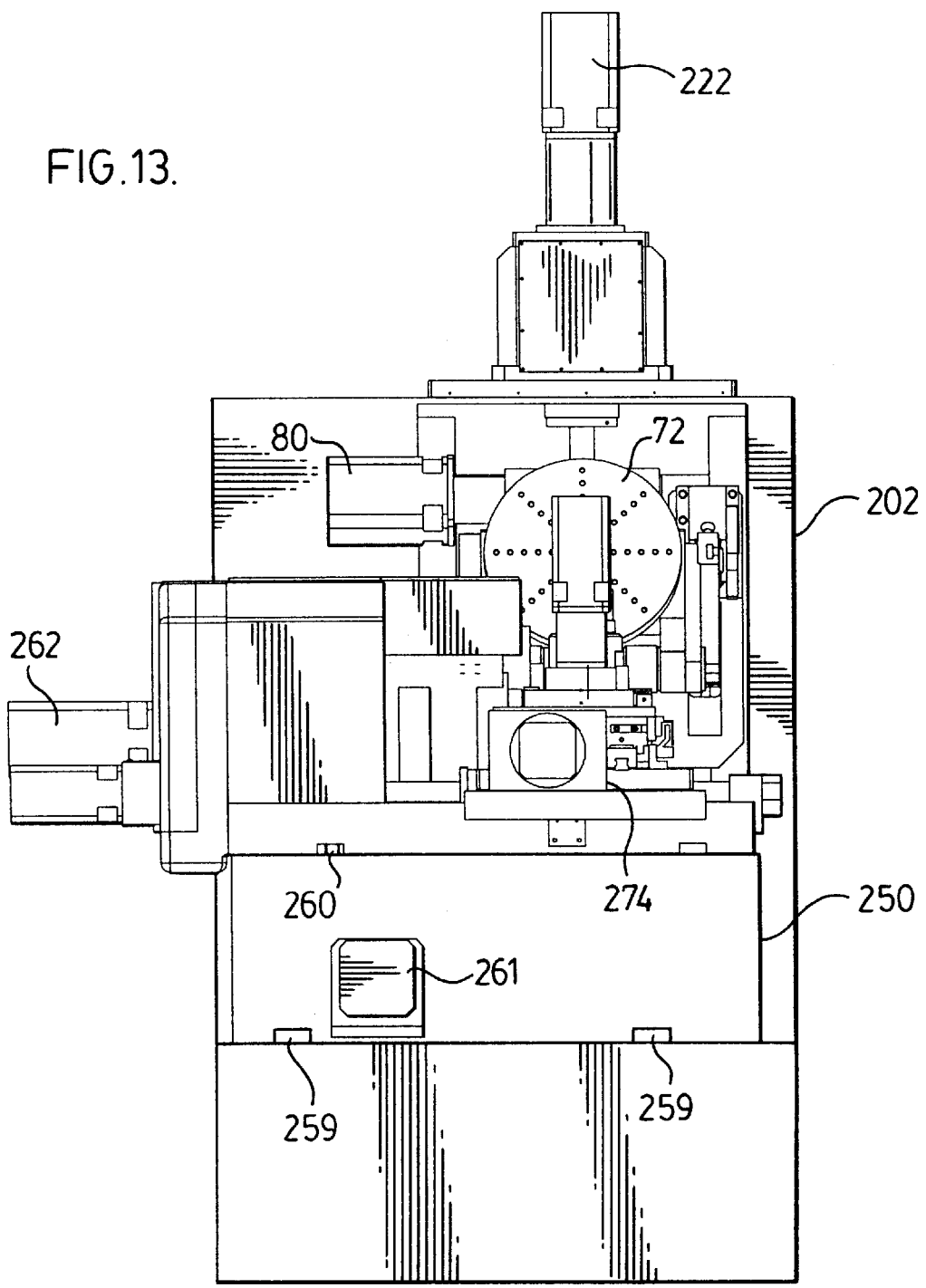
FIG. 13 is an end view of the machine of FIG. 9.
Figure 14:
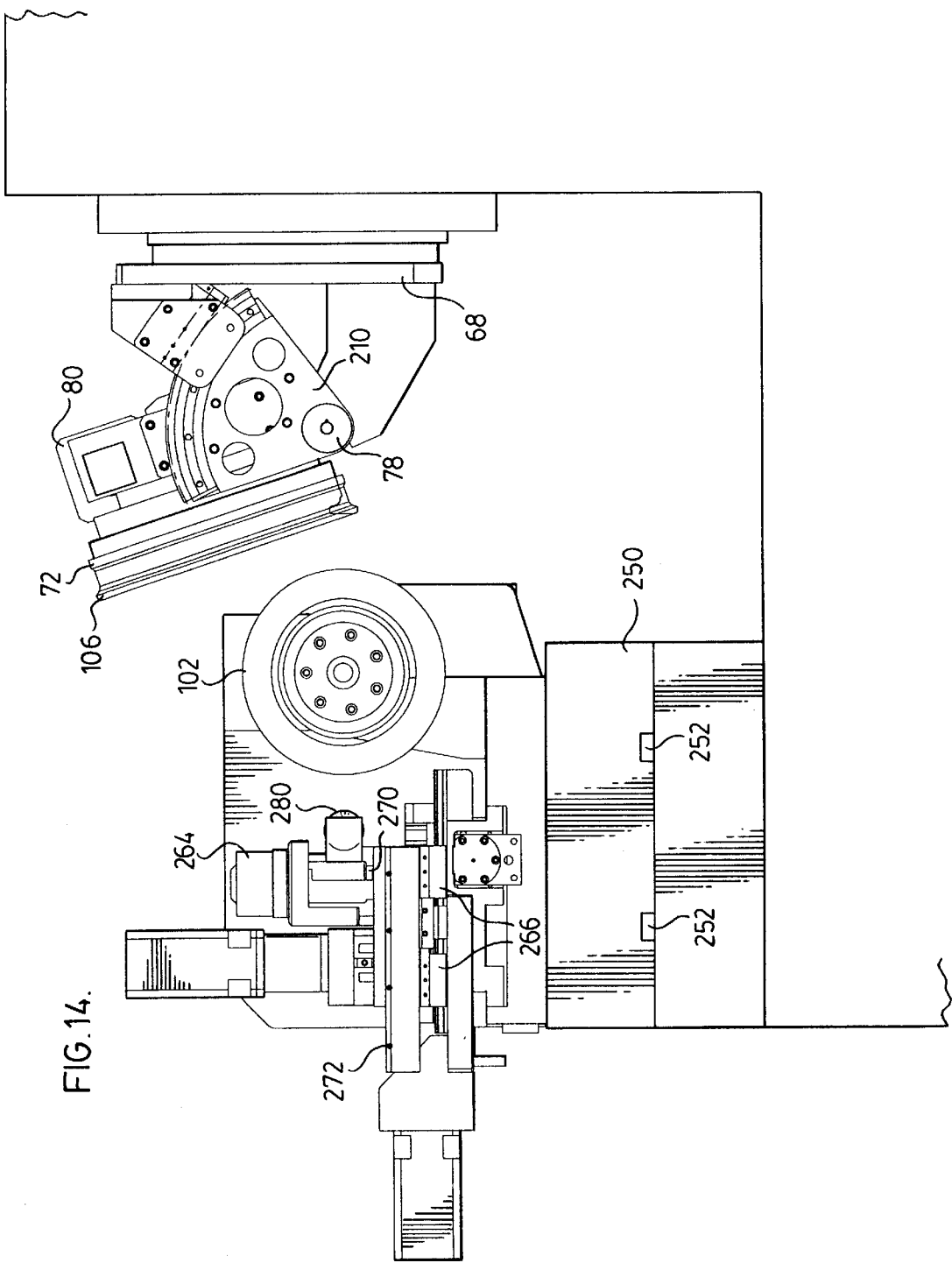
FIG. 14 is a front elevation of a concave face gear grinding apparatus.

Grinding wheel 102 rotates about an axis designated as axis "C" and is driven by motor 262 which is integrally mounted on carriage 254. Grinding wheel 102 has a predetermined profile inscribed on its surface as shown in FIGS. 10 and 11.

During the initial set up of the machine 200, axes "TF" and "WT" are set with respect to the tooth configuration already existing on face gear 70 and locked. (Face gear 70 has already undergone tooth shaping and surface hardening operations before being mounted in machine 200.) During the initial approach of the grinding wheel 102 to face gear 70, motor 262 is rotating the grinding wheel 102 about axis "C" and the carriage 254 is fed along the "V" axis toward face gear 70 until the desired grinding position is reached. The face gear table 214 undergoes controlled movement along the feed axis "W" until the grinding wheel has moved sufficiently so that the entire tooth face 71 of face gear 70 has been traversed by grinding wheel 102. The grinding wheel 102 is then moved slightly toward table 214 and the grinding operation is repeated until the desired depth of the tooth form and shape is generated.

A rotary diamond dressing tool assembly 264 is also mounted on grinding table 258 on rails 256. The assembly 264 includes a rotary device 266 which rotates a diamond impregnated disc 280 (see FIG. 10). The disc 280 is used to generate (by abrasion) a prescribed form 268 in grinding wheel 102 (see FIG. 11). Device 266 is adjustable in height and angle on and about post 270 on which device 266 is mounted. The entire dresser assembly 264 is mounted on table 258 so as to be capable of controlled motion in three axes. A first axis of motion allows the dresser assembly mounted on feed table 274 to move backwards and forwards along rails 272 away from and towards grinding wheel 102. This axis is designated as the "Y" axis.

Movement of the dresser tool along rails 256 in a translatory fashion (parallel to grinding wheel 102) is designated as the "X" axis. Movement of the dresser wheel 280 about post 270 in an angular fashion will define the angular axis "A".

The grinding wheel profile 268 demands that the movement of the feed table assembly 274 for the dresser assembly 264 be synchronized with the rotation of grinding wheel 102 in order that disc 280 of the dresser assembly 264 properly meshes with the profile 268 of grinding wheel 102.

The grinding operation of the partially completed and surface hardened face gear 70 is as follows:

The rotating table 72 is manually set to a predetermined tilt (WTT) and swivel (WTS) setting and these positions are locked. The partially finished gear is mounted on the face plate 72 so as to have a predetermined angular position on axis "B".

The grinding wheel carriage 254 is set at the appropriate angle on the pivot axis WT and locked. Carriage 254 is moved along rails 252 until the grinding wheel 102 is set at a predetermined position on the "TF" axis with respect to face gear 70 and locked in this position.

The rotating grinding wheel 102 is now moved along the "V" "feed" axis to move toward the partially finished rotating face gear 70 until a desired face gear grinding position is achieved.

Work table 214 is now moved vertically along rails 216 to permit the grinding wheel 102 to traverse the entire face of the gear 70 as the grinding operation continues. This process is repeated in a series of grinding passes until the desired depth and tooth configuration is generated in face gear 70.

Periodically during the grinding operation, the profile of the grinding wheel 102 must be restored. At this time, the grinding wheel 102 is retracted from the face gear 70 and the dresser assembly 264 is brought into position on rails 272 and 256 to engage grinding wheel 102 and to restore the profile 268 on wheel 102 to its original profile.

The grinding disc 280 is engaged with grinding wheel 102 in accordance with CNC control to move in a controlled manner to restore the profile 268 to wheel 102 to its required dimensional shape.

Figure 15:
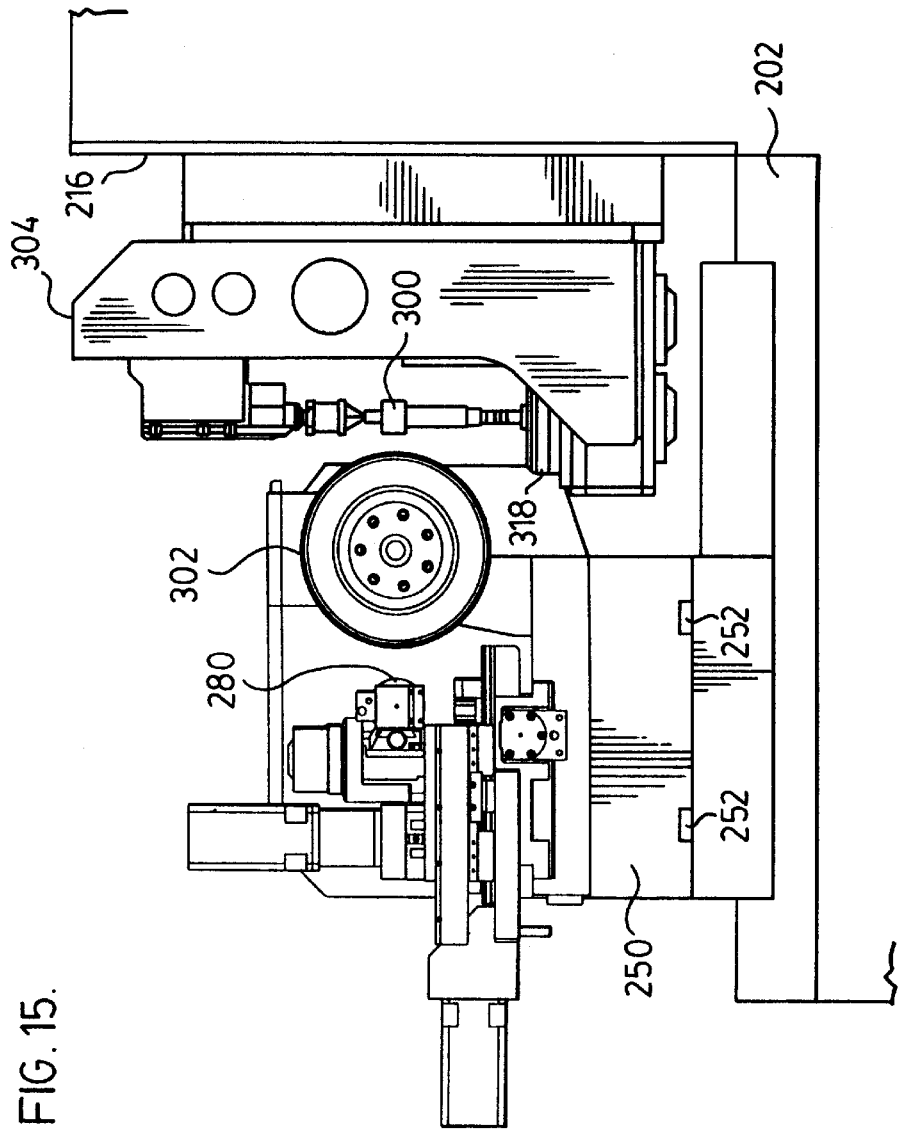
FIG. 15 shows a perspective view of a face gear grinding apparatus adapted for producing teeth on a pinion gear.

FIG. 15 shows the apparatus of FIG. 9 modified to permit the finish grinding of a pinion 300. Pinion 300, in this instance, is a tapered spur gear pinion. Grinding wheel 302 now carries a significantly different profile from the profile inscribed in the surface of grinding wheel 102 for face gear grinding. The profile inscribed on the surface of wheel 302 is similar to that shown in FIG. 3.

The face gear work head 68 of FIG. 9 has been replaced with work table 304 which supports and rotates pinion 300 during grinding.

Tapered pinion 300 rotates about an axis designated as "B1" in an angular motion synchronized with grinding wheel 302. The work table assembly 304 is capable of vertical translatory motion along rails 216 designated the "W" axis as previously in FIG. 9. The motion of the grinding wheel 302 along the "V" axis is CNC controlled; the movement of the pinion 300 along the "W" axis is CNC controlled. It will be obvious to those skilled in the art that the motion of the grinding wheel in the "V" axis must be carefully coordinated with the motion of table 304 along rails 216 in order to produce the tapered spur gear pinion 300.

The dresser apparatus for grinding wheel 302 is required as previously, but is omitted from FIG. 15 for reasons of clarity. For the reader's convenience, an Axis Definition Table is set out below:

| AXIS | DEFINITION | CONTROL |
| --- | --- | --- |
| C | Grinding Wheel 102 (302) Rotation | CNC |
| V | Grinding Wheel 102 (302) in Feed | CNC |
| WT | Grinding Wheel 102 (302) Tilt | Manual |
| TF | Grinding Wheel 102 (302) Tangential Feed | Manual |
| B | Rotating Table 72 Rotation (Face Gears) | CNC |
| B1 | Driving head 318 Rotation (Tapered Spur Gear Pinion) | CNC |
| W | Work Table 214 Axial Feed | CNC |
| WTS | Work Head 212 (68, 304) Swivel | Manual |
| WTT | Work Table 78 Tilt | Manual |
| A | Dresser Tool 264 Rotary Feed | CNC |
| X | Dresser Tool 264 Cross Feed | CNC |
| Y | Dresser Tool 264 In Feed | CNC |
| DH | Dresser Tool 264 Height | Manual |
| DT | Dresser Tool 264 Tilt | Manual |

Basic Operation of the Face Gear Grinding Machine 200

This machine 200 utilizes a CNC system that enables the axes under its control to be moved in a predetermined manner via a set of instructions in a program. Numerous programs will be created to control the dressing cycle and gear grinding cycle of the machine 200 for different configurations of gears. The CNC control enables the axes of motion to be continually synchronized even when switching between the dressing and grinding cycles.

Manual Settings

The work table 212 swivel "WTS" is usually set in the vertical position and locked.

The work table 214 tilt "WTT" is set to the required Face Gear face angle and locked.

Grinding wheel 102 (302) tilt "WT" is set for lead angle compensation.

The grinding wheel tangential feed "TF" is adjusted to center the wheel with respect to the central axis of the gear.

Dresser rotary device 266 tilt is set for angular clearance "DT" and diamond disc 280/grinding wheel 102 (302) center line height "DH".

These settings will not be adjusted while grinding, only when the gear configuration changes.

Grinding Wheel Dressings CNC Controlled

CNC programs stored in the memory of the CNC control are selected to control this process. These programs command the motion of dresser axes X, Y, A, and grinding wheel 102 (302) axis C in a prescribed manner to generate the required form on the grinding wheel (FIG. 11 work profile 268). These programs control the speed and direction of rotation of the grinding wheel 102 (302) with respect to the speed and direction of motion of the dresser assembly 264, axes X, Y and A.

Gear Grinding, CNC Controlled

Via the CNC and the selected program the speed of rotation of the grinding wheel 102 (302) (axis C) relative to the speed of rotation of the gear 70 (axis B) being ground is controlled. This relationship is controlled via an electronic gearbox, which is a feature of the CNC. It is an important feature as the grinding process simulates the meshing of a worm gear which is the Grinding Wheel 102 (302) with a face gear such as 70 which is the gear being finish ground. Also via the program and CNC, the following functions are also controlled:

Depth of Cut (axis V)—infeed of grinding wheel 102 (302) to workpiece (Face Gear 70), Vertical Feed of workpiece across grinding wheel 102 (302) (axis W), Diamond Disc 280 Speed, Dimensional offsets and adjustments, Activation of periodic re-dressing of the grinding wheel 102 (302), Coolant on/off, and Machine lubrication.

Figure 16:
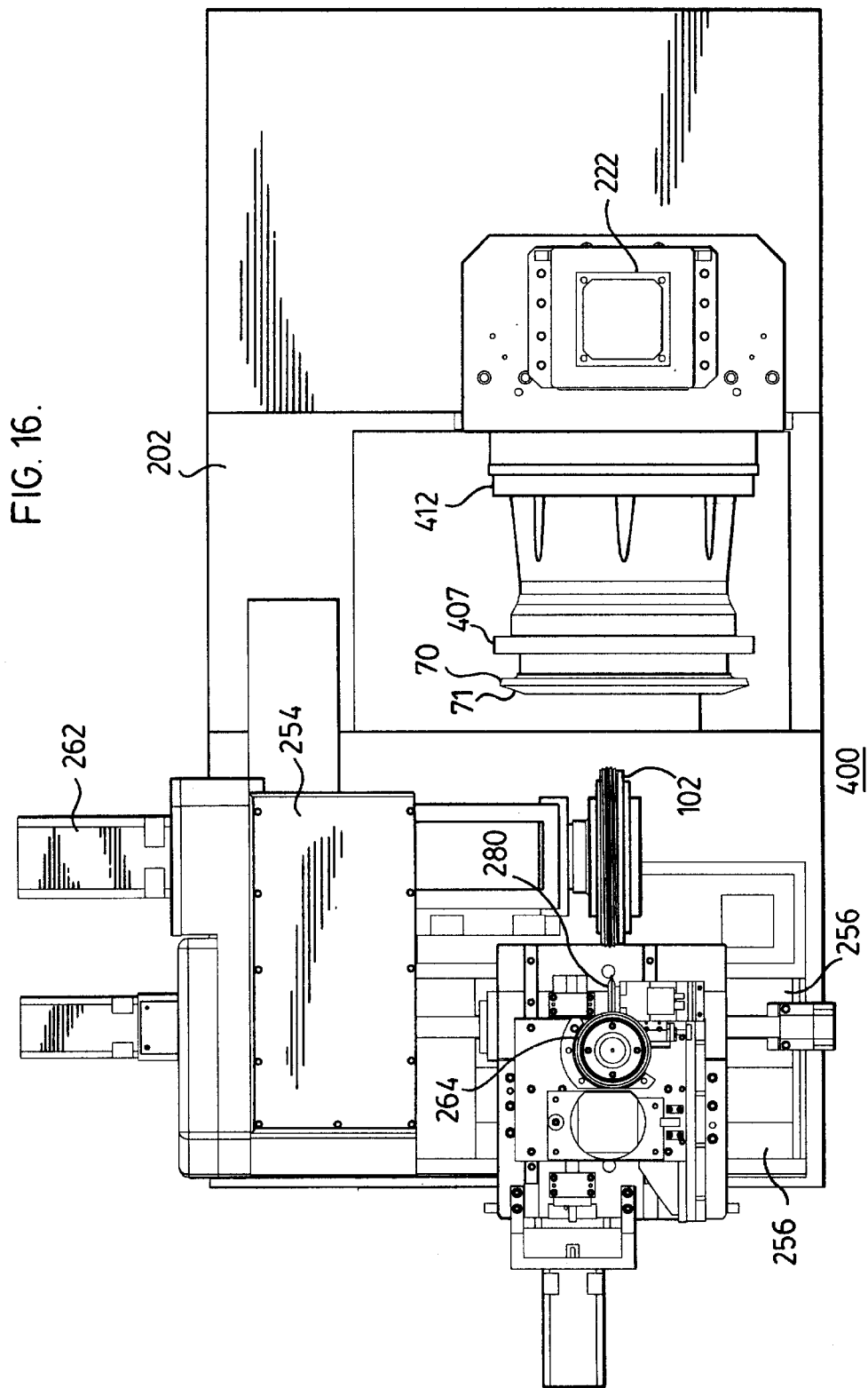
FIG. 16 is a plan view of an alternative embodiment of the machine shown in FIG. 9.
Figure 17:
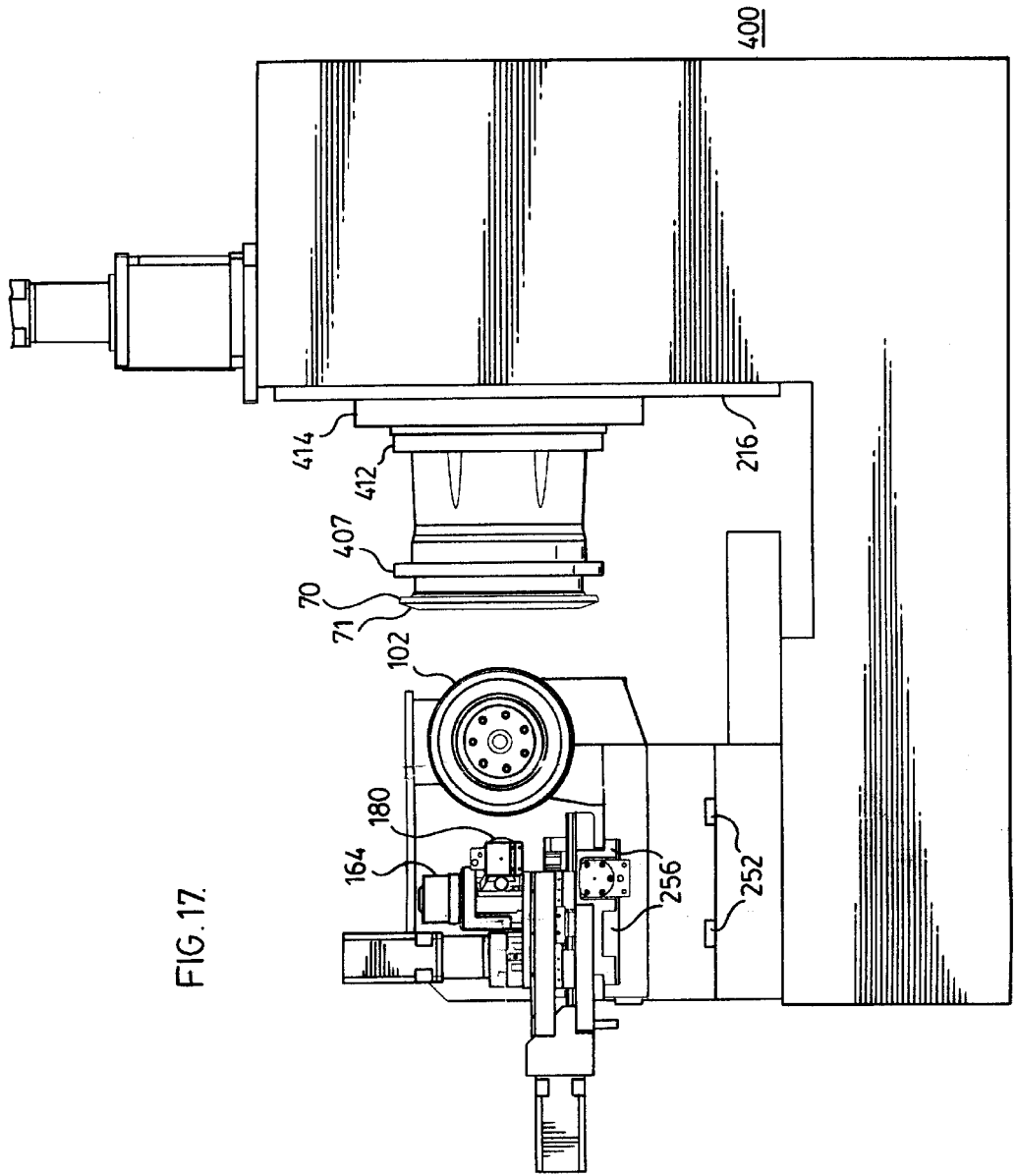
FIG. 17 is an elevational view of the machine of FIG. 16.
Figure 18:
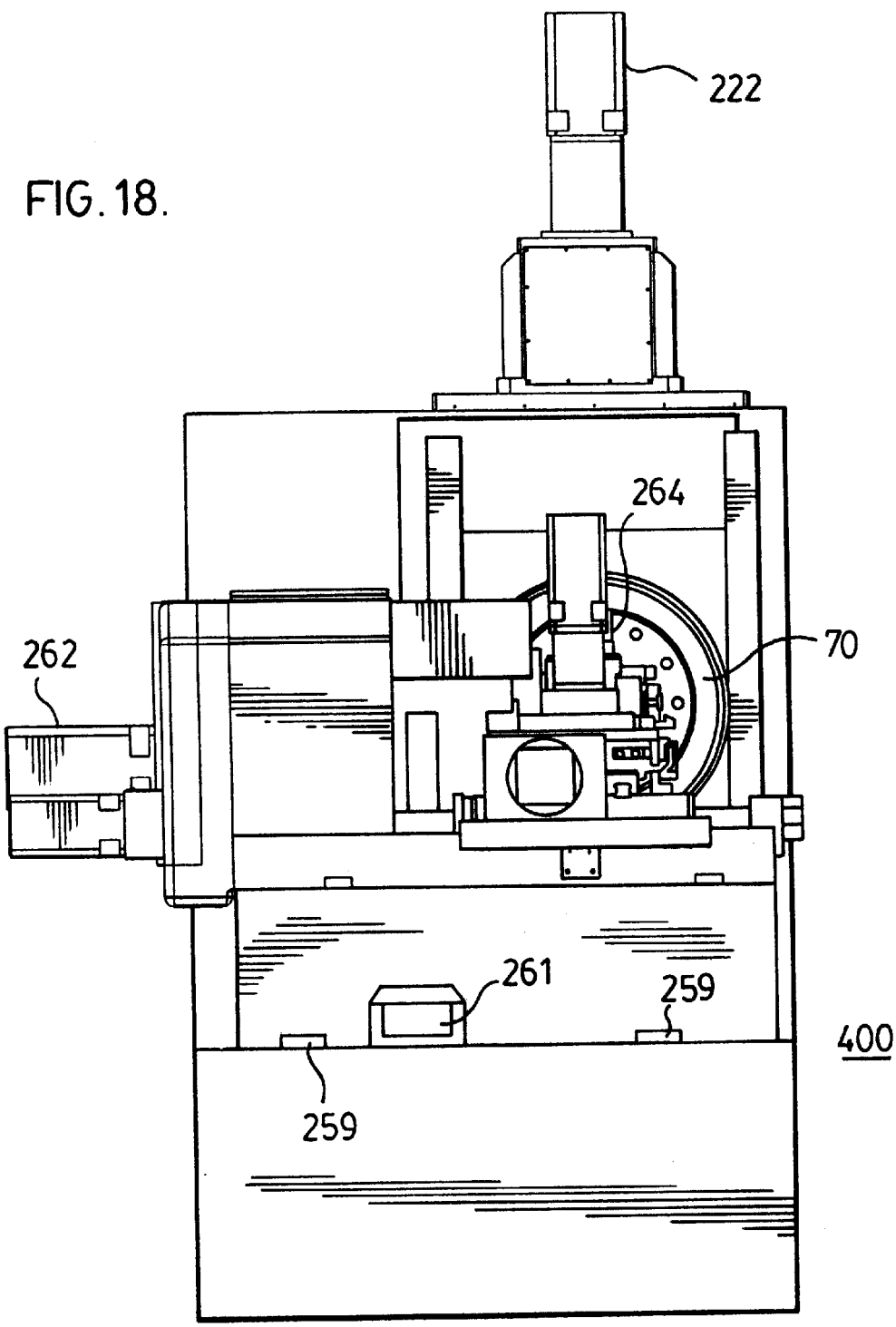
FIG. 18 is an end view of the machine of FIG. 16.

An alternative embodiment of this invention will now be described using FIGS. 16–18. In this embodiment, the grinding apparatus is physically much the same as apparatus previously described. The apparatus of FIGS. 16–18 is simplified somewhat in that the apparatus associated with the work table tilt along the WTT axis is now omitted. In order to provide the required tooth profile for a convex (70) or a concave (106) face gear mounted on the work table, two axis of motion are required for moving the grinding wheel along the "V" axis as the face gear is vertically moved up and down on its "W" axis. Motion in both these axes must be carefully coordinated by CNC control as those skilled in the art will know.

FIG. 16 is a plan view of the modified apparatus 400 for producing the desired tooth configuration on face gear 70. Modified face gear apparatus comprises the same base 202 which is shown in FIG. 9. Work table 414 (See FIG. 17) is driven by a drive motor 222 to move up and down along rails 216 (along the "W" axis) in a vertical plane. Face gear 70 is mounted on face gear rotating table 407 which is driven by a CNC drive motor (similar to drive motor 218 of FIG. 9) for rotation of face gear 70 about the "B" axis.

Grinding wheel carriage 254 is confined to move in a translationary fashion along rails 256 along the "TF" axis. The grinding wheel carriage is also permitted to moved back and forth along rails 259 ("V" axis) as driven by drive motor 261. It is this motion which must be very closely controlled and coordinated with work table motion along rails 216 during a grinding operation because the face plane 71 of gear 70 is no longer in a vertical plane at the grinding contact area.

In this instance the profile of grinding wheel 102 is exactly the same as shown in FIG. 11 and the function and operation of dressing disc 200 is exactly the same as shown in FIGS. 9 and 10.

Thus the hardware of FIGS. 16–18 is somewhat simplified but an increasing amount of software is required to control the motion of grinding wheel 102.

Examples of the composition of the basic material for gear 70 or pinion 300 which may be used successfully to accomplish this invention is:

(a) SAE 9310 STL having components:
  Iron—94.765%
  Nickel—3.25%
  Chromium—1.20%
  Manganese—0.55%
  Molybdenum—0.11%
  Carbon—0.10%
  Silicon—0.025% max. or, (b) PYROWEAR ALLOY 53 having the following components:
  Iron—90.2%
  Molybdenum—3.25%
  Copper—2.00%
  Nickel—2.00%
  Chromium—1.00%
  Silicon—1.00%
  Carbon—0.1%
  Vanadium—0.1%

Figure 19:
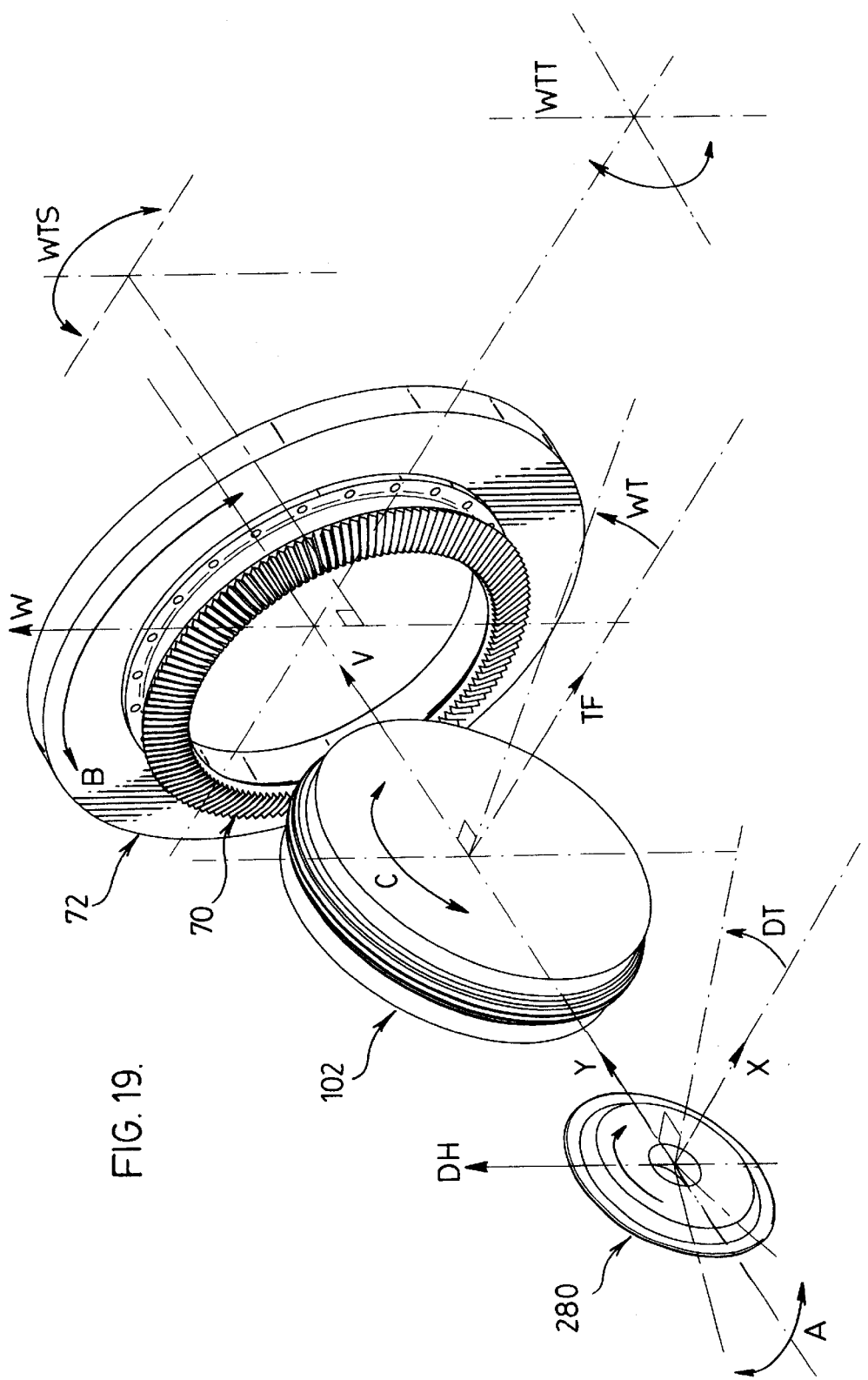
FIG. 19 is a space representation of the three major components of the face gear machine, to more clearly illustrate the various component axes.
Figure 20:
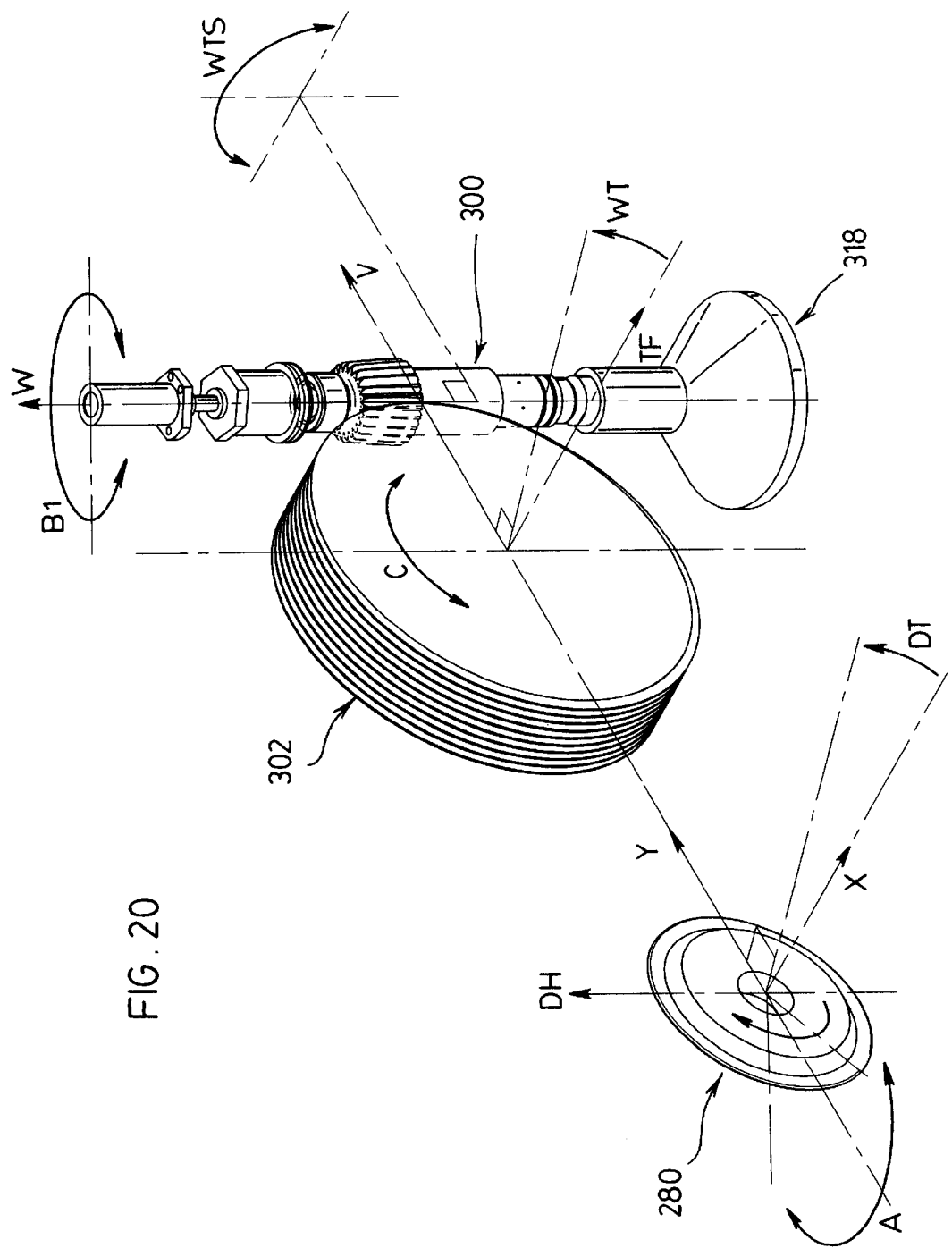
FIG. 20 is a space representation of the three major components of the machine illustrated in FIG. 15 to more clearly illustrate the various component axes.

FIGS. 19 and 20 have been added to more clearly illustrate the orientation of the three major components in a face gear and a pinion gear grinding operation. The various axes about which component motion takes place are clearly shown in these figures.

What is claimed is:

1. A precision grinding apparatus for grinding face gears comprising:

suitable gear table means being controllably driven for rotation about a central axis (B), said gear table means also being movable in a vertical plane along a (W) axis in a second controlled manner, a cased hardened face mounted on said gear table means, said face gear having a series of gear teeth formed therein, a grinding wheel mounted on said apparatus having a third controlled driven rotation about a central (C) axis, said grinding wheel being provided with a grinding surface of a predetermined shape in the form of a worm for meshing with and grinding the gear teeth existing on said gear to a predetermined finished shape, said grinding wheel being movable in a fourth controlled manner toward and away from said gear along a feed (V) axis, wherein motion of said grinding wheel in said (C) and (V) axes and movement of said gear in said (B) and (W) axes is controlled by a central control means.

2. A precision grinding apparatus as claimed in claim 1 wherein dressing apparatus is mounted on said apparatus in a predetermined relationship with said grinding wheel, said dressing apparatus comprising a driven grinding disc of a second predetermined shape for controlled motion toward and away from said grinding surface of said grinding wheel along a (Y) axis, said disc being mounted on said apparatus for movement along an axis (X) substantially parallel to said (C) axis of said grinding wheel, and wherein said (X) axis is orthogonal to said (Y) axis, said disc also being capable of angular movement about a central dressing axis (A), said movement in said (X), (Y) and (A) axis is coordinated by and under the control of said central control means to restore said grinding surface of said grinding wheel to said predetermined shape.

3. A grinding machine as claimed in claim 1 wherein said grinding wheel is movable in a direction along an axis (TF) tangential to said gear and orthogonal to said (V) axis, and said grinding wheel is capable of being tilted about a tilt axis (WT).

4. A grinding machine as claimed in claim 3 wherein dressing means is provided for restoring the profile of said worm of said grinding wheel.

5. A precision grinding apparatus as claimed in claim 1 wherein said grinding wheel means is movable along an axis tangential to said gear designated (TF), and said grinding wheel means is tiltable about a pivot axis designated (WT).

6. A precision grinding apparatus for a face gear comprising:

a base having a grinding means mounted thereon for generating teeth in a gear by abrasion, and a gear driving means mounted on said base in juxtaposition to and cooperating with said grinding means, a case hardened gear having preformed teeth of a predetermined size and configuration mounted on said gear driving means, said gear driving means having the capability of rotating said gear in a manner controlled by first CNC control means in a central axis designated as (B), said gear driving means also being provided with the capability of moving said gear up and down in a vertical axis designated as (W) in a manner controlled by second CNC control means, said grinding means comprising a grinding wheel having a grinding surface in which a worm of predetermined configuration is generated therein, said grinding wheel being rotatably driven and controlled by third CNC control means to control the rotation of said grinding wheel in its central axis designated as (C), said grinding wheel means also having fourth CNC control means to control the motion of said grinding wheel toward and away from said gear along a (V) axis, said CNC control means cooperating together to mesh said worm with said teeth of said gear to form teeth in said gear in a continuous grinding operation.

7. A precision grinding apparatus as claimed in claim 5 in which grinding wheel dressing apparatus is mounted in a cooperating relationship with said grinding means to engage said grinding surface in a manner controlled by three additional CNC control devices to restore said worm to its original configuration when a predetermined amount of distortion of said worm is discerned.

8. A precision grinding apparatus as claimed in claim 7 wherein said three additional CNC control devices include:

(i) fifth CNC control means to control motion of said dressing apparatus toward and away from said grinding surface along an axis designated (Y), (ii) sixth CNC control means to control motion of said dressing apparatus along an axis parallel to said (C) axis, designated as (X), (iii) seventh CNC control means to control angular motion of said dressing apparatus about a pivot axis designated as (A).

9. A precision grinding apparatus as claimed in claim 7 wherein said dressing means comprises a disc having a predetermined shape for engaging said surface of said grinding wheel to restore said worm configuration by abrasion.

10. A precision grinding apparatus for a tapered pinion gear comprising:

a base having a grinding means mounted thereon for generating teeth in a gear by abrasion, and a gear driving means mounted on said base in juxtaposition to and cooperating with said grinding means, a case hardened tapered pinion gear having preformed teeth of a predetermined size and configuration mounted on said gear driving means, said gear driving means having the capability of rotating said gear in a manner controlled by first CNC control means in a central axis designated as (B1), said gear driving means also being provided with the capability of moving said tapered pinion gear up and down in a vertical axis designated as (W) in a manner controlled by second CNC control means, said grinding means comprising a grinding wheel having a grinding surface in which a worm of predetermined configuration is generated therein, said grinding wheel being rotatably driven and controlled by third CNC control means to control the rotation of said grinding wheel in its central axis designated as (C), said grinding wheel means also having fourth CNC control means to control the motion of said grinding wheel toward and away from said tapered pinion gear along a (V) axis, said CNC control means cooperating together to mesh said worm with said teeth of said tapered pinion gear to form teeth in said gear in a continuous grinding operation.

11. A precision grinding apparatus as claimed in claim 10 wherein said grinding wheel means is movable along an axis tangential to said gear designated (TF), and said grinding wheel means is tiltable about a pivot axis designated (WT).

12. A precision grinding apparatus as claimed in claim 11 in which grinding wheel dressing apparatus is mounted in a cooperating relationship with said grinding means to engage said grinding surface in a manner controlled by three additional CNC control devices to restore said worn to its original configuration when a predetermined amount of distortion of said worm is discerned.

13. A precision grinding apparatus as claimed in claim 12 wherein said three additional CNC control devices includes:

(i) fifth CNC control means to control motion of said dressing apparatus toward and away from said grinding surface along an axis designated (Y), (ii) sixth CNC control means to control motion of said dressing apparatus along an axis substantially parallel to said (C) axis, designated as (X), (iii) seventh CNC control means to control angular motion of said dressing apparatus about a pivot axis designated as (A).

14. A precision grinding apparatus as claimed in claim 12 wherein said dressing means comprises a disc having a predetermined shape for engaging said surface of said grinding wheel to restore said worm configuration by abrasion.

* * * * *